United States Patent
Lupu et al.

(10) Patent No.: US 6,549,707 B1
(45) Date of Patent: Apr. 15, 2003

(54) GRATING-TYPE OPTICAL FILTER WITH APODISED SPECTRAL RESPONSE

(75) Inventors: Anatole Lupu, Cachan (FR); Alain Carenco, Bourg-la-Reine (FR)

(73) Assignee: France Telecom (FR)

( * ) Notice: Subject to any disclaimer, the term of this patent is extended or adjusted under 35 U.S.C. 154(b) by 0 days.

(21) Appl. No.: 09/743,005
(22) PCT Filed: Jun. 30, 1999
(86) PCT No.: PCT/FR99/01571
§ 371 (c)(1), (2), (4) Date: Feb. 26, 2001
(87) PCT Pub. No.: WO00/02078
PCT Pub. Date: Jan. 13, 2000

(30) Foreign Application Priority Data

Jul. 1, 1998 (FR) .............................. 98 08391

(51) Int. Cl.⁷ ................................. G02B 6/34
(52) U.S. Cl. ........................... 385/37; 385/31
(58) Field of Search ................ 359/573, 575, 359/569; 385/37, 31

(56) References Cited

U.S. PATENT DOCUMENTS 5,225,930 A  *  7/1993  Land et al. .............. 359/578
5,668,900 A        9/1997  Little et al. ............. 385/37

FOREIGN PATENT DOCUMENTS

| FR | 195 00 136 A1 | 7/1996 |
| FR | PCT/FR/99/01571 | 6/1999 |
| GB | WO 97/22023 | 6/1997 |

OTHER PUBLICATIONS

Semiconductor Monolithic Wavelength Selective Router Using a Grating Switch Integrated with a Directional Coupler.
Polarisation–Independent Optical Filters Based on Co–Directional Phase–Shifted Grating–Assisted Couplers: Theory and Designs.
Coupling Coefficient Modulation of Waveguide Grating Using Sampled Grating.
Design of Step–Chirped Fibre Bragg Gratings.
Broadband Spatial Mode Conversion by Chirped Fiber Bending.
On the Use of Tapered Linearly Chirped Gratings as Dispersion–Induced Distortion Equalizers in SCM Systems.
"Moire Phase Masks for Automatic Pure Apodisation of Fibre Bragg Gratings," J. Albert et al., *Electronics Letters* vol. 32, No. 24 Nov. 21, 1996.
"Simple Technique for Apodising Chirped and Unchirped Fibre Bragg Gratings," R. Kashyap et al., *Electronics Letters* vol. 32, No. 13 Jun. 20, 1996.

(List continued on next page.)

*Primary Examiner*—Cassandra Spyrou
*Assistant Examiner*—Alessandro V. Amari
(74) *Attorney, Agent, or Firm*—Blakely Sokoloff Taylor & Zafman

(57) ABSTRACT

A device is presented that is adapted to have an optical wave travel through it and to filter that wave in terms of wavelength, in which an optical parameter of the device varies along the path of the wave in such a manner that the device has a series of sections each constituted by a pair of two successive segments, one in which the values of the optical parameter are less than an average value and the other in which the values of the optical parameter are greater than the average value. The device has at least one zone of more than two sections. The two sections have lengths alternately less than and greater than an average length of the sections in that zone.

22 Claims, 10 Drawing Sheets

OTHER PUBLICATIONS

"Apodisation of the Spectral Response of Fibre Bragg Gratings Using a Phase Mask with Variable Diffraction Efficiency," J. Albert et al., *Electronics Letters* vol. 31, No. 3 Feb. 2, 1995.

"Apodized In–Fribre Bragg Grating Reflectors Photoimprinted Using a Phase Mask," B. Malo et al., *Electronics Letters* vol. 31, No. 3 Feb. 2, 1995.

"Sidelobe Suppression in Grating–Assisted Wavelength–Selective Couplers," Hajime Sakata, *Optics Letters,* vol. 17, No. 7 Apr. 1, 1992.

"High Sidelobe Suppression Ration in a Directional Coupler Optical Filter," S. Francois et al., Proc. 7th Eur. Conf. on Int. Opt. (ECIO '95).

"Synthesis of Ideal Window Filter Response in Grating–Assisted Couples," Little et al., *Optics Letters,* vol. 21, No. 10, May 15, 1996.

"Synthesis of Codirectional Couples with Ultralow Sidelobes and Minimum Bandwidth," Little et al., *Optics Letters,* vol. 20, No. 11 Jun. 1, 1995.

"Toward the Ideal Codirectional Bragg Filter with an Acousto–Optic–Filter Design," G. Hugh Song, *Journal of Lightwave Technology,* vol. 13, No. 3 Mar. 1995.

B.E. Little, C. Wu, O.P. Huang, "Synthesis of ideal window filter response in grating–assisted couplers", Optics Lett., vol. 21, pp. 725–727, 1996.

B.E. Little, C. Wu, W.P. Huang, "Synthesis of codirectional couplers with ultralow side lobes and minimum bandwidth", Opticvs Lett., vol. 22, pp. 1259–1261, 1995.

G.H. Song, "Toward the ideal codirectional Bragg filter with an acousto–optic–filter design", J.Lightwave Technol., vol. 13, 001 470–780k 1995.

J. Albert, K.O. Hill, D.C. Jopnson, F. Bilodeau, M.J. Rooks, "Moire phase masks for automatic pure apodisation of fibre Bragg gratings", Electronic Lett., vol. 32, pp. 2260–2261, 1996.

P. Kashyap, A. Swanton, D.J. Armes, "Simple technique for apodising chirped and unchirped fibre gratings", Electronic Lett., vol. 32, pp. 1226–1227, 1996.

J. Albert, K.O. Hill, B. Malo, S. Theriault, F. Bilodeau, D.C. Jonson, L.E. Erickson, "Apodisation of the spectral response of fibre Bragg gratings using a phase mask with variable diffraction efficiency ", Electronics Lett., vol. 31, pp. 222–223, 1995.

B. Malo, S. Theriault, D.C. Johnson, F. Bilodeau, J. Albert, K.O. Hill, "Apodised in fibre Bragg grating reflectors photoimprinted using a phase mask", Electronic Lett., vol. 31, pp. 223–225, 1995.

H. Sakata, "Side lobe suppression in grating–assisted wavelength–selective couplers", Optics lett., vol. 17, pp. 463–465, 1992.

S. Francois, M. Filoche, F. Huet, S. Fouchet, G. Herve–Gruyer, A. Ougassaden, J. Brandon, N. Bouadma, M. Carre, A. Carenco, "High side lobe suppression ration in a directional coupler optical filter", proc. ECIO 95, pp. 315–317, 1995.

Y. Shibata, S. Oku, Y. Kondo, T. Tamamura, M. Naganuma, "Semiconductor monolithic wavelength selective router using a grating switch integrated with a directional coupler", J. Lightwave Technol., vol. 14, pp. 1027–1032, 1996.

Q. Guo, W.P. Huang, "Polarisation–independent optical filters based on co–directional phase–shifted grating assisted couplers: theory and decision", IEEE Proc.–Optoelectron., vol. 143, pp. 173–177, 1996.

Y. Shibata, T. Tamamura, S. Oku, Y. Kondo, "Coupling coefficient modulation of waveguide grating using sample grating", IEEE Photonics Technol. Lett. vol. 6, pp. 1222–1224, 1994.

R. Kashyap, "Design of step chirped fibre gratings", Optics Commun., vol. 136, pp. 461–469, 1997.

D. Ostling, H.E. Engan, "Broadband spatial mode conversion by chirped fibre bending", Optics Lett., vol. 1, pp. 192–194, 1996.

J. Marti, D. Pastor, M. Tortola, J. Capmany, A. Montera, "On the use of tapered linearly chirped gratings as dispersion–induced equalizers in SCM systems", J. Lightwave Technol., vol. 15, pp. 179–187, 1997.

* cited by examiner

GRATING-TYPE OPTICAL FILTER WITH APODISED SPECTRAL RESPONSE

BACKGROUND OF THE INVENTION

1. Field of the Invention

The present invention concerns the field of guided wave optical devices including a grating, that is to say including a part through which an optical wave travels and in which an optical parameter varies in an alternating manner along the path of the light.

2. Description of the Related Art

The invention concerns codirectional couplers and couplers, guided wave Bragg reflectors, fibre type mode converters or Bragg reflectors for VCSEL cavities, for example.

The above devices filter optical waves. They eliminate waves with wavelengths outside a chosen range.

Generally speaking, an optical filter is of good quality when it selects wavelengths to be transmitted and wavelengths to be rejected precisely. In other words, the filter is of good quality if its spectral response takes substantially constant values close to 1 in the range of wavelengths to be transmitted and substantially constant values close to 0 outside of that range.

The spectral responses of current grating filters feature secondary lobes, however.

Various methods have been proposed for producing optical filters in which such secondary lobes are small in amplitude, in other words filters with a high rejection rate. The skilled person knows such methods as apodisation methods.

When the grating device is the site of interference formally described using the principle of coupled modes, apodisation methods have been proposed that consist in modulating an amplitude of variation of the coupling coefficient along the path of the light.

A first such method of varying the amplitude of the coupling coefficient which is routinely used in designing codirectional and contradirectional couplers is implemented by varying an interguide distance. This method is described in B. E. Little, C. Wu, W. P. Huang, "Synthesis of ideal window filter response in grating-assisted couplers", Optics Lett., vol. 21, pp. 725–727, 1996; B. E. Little, C. Wu, W. P. Huang, "Synthesis of codirectional couplers with ultralow side lobes and minimum bandwidth", Optics Lett., vol. 22, pp. 1259–1261, 1995; and G. H. Song, "Toward the ideal codirectional Bragg filter with an acousto-optic-filter design", J. Lightwave Technol., vol. 13, pp. 470–480, 1995. It produces in the order of 30 dB to 40 dB apodisation of the secondary lobes.

The accompanying FIG. 1 is a top view of an interguide distance variation codirectional coupler of the above kind.

In this device the distance between two guides is caused to oscillate by transverse undulation of one of the two guides which yields an oscillatory distribution of the coupling coefficient along the undulating guide, in accordance with the coupled mode principle. The period of the oscillation determines the initial wavelength or the phase lock length selected by the device.

The undulating guide also has a generally arcuate shape so that the interguide distance is minimum at the centre of the device and maximum at its ends. The average coupling coefficient calculated at each undulation therefore has a maximum in the central part and decreases progressively towards the ends of the guides.

This bell-shaped variation of the average coupling coefficient calculated at each undulation reduces the secondary lobes of the spectral response of the filter.

However, the above method has a major drawback associated with the fact that the average interguide distance must undulate with an amplitude in the range of 2 $\mu$m to 5 $\mu$m, the amplitude of sinusoidal variation being in the order of 1 $\mu$m. Implementing it therefore requires great precision in the variations of the interguide distance, which is difficult to achieve in practice.

Moreover, the coupling coefficient is related to the interguide distance by a non-linear function and this tends to accentuate the negative effects of errors and uncertainties on the interguide distance.

The method is also difficult to implement for vertical couplers and cannot be applied to components in which there is only one guide, for example Bragg reflectors like that shown in the accompanying FIG. 3 or light mode converters.

A second method, known as the modulation amplitude variation method, consists in varying the coupling coefficient by varying a corrugation profile or varying the refractive index in a fibre.

When the corrugation profile is varied, it is in practice difficult to control corrugation amplitudes so that the modulation of the coupling coefficient is sufficiently precise. The corrugation amplitudes required are generally below 1 $\mu$m.

When the index in the fibre is varied, very complex and very exacting ultraviolet exposure techniques are employed. These methods are described in J. Albert, K. O. Hill, D. C. Jonson, F. Bilodeau, M. J. Rooks, "Moire phase masks for automatic pure apodisation of fibre Bragg gratings", Electronic Lett., vol. 32 pp. 2260–2261, 1996; P. Kashyap, A. Swanton, D. J. Armes, "Simple technique for apodising chirped and unchirped fibre gratings", Electronic Lett., vol. 32, pp. 1226–1227, 1996; J. Albert, K. O. Hill, B. Malo, S. Thériault, F. Bilodeau, D. C. Jonson, L. E. Erickson, "Apodisation of the spectral response of fibre Bragg gratings using a phase mask with variable diffraction efficiency", Electronics Lett., vol. 31, pp. 222–223, 1995; and B. Malo, S. Thériault, D. C. Jonson, F. Bilodeau, J. Albert, K. O. Hill, "Apodised in fibre Bragg grating reflectors photoimprinted using a phase mask", Electronic Lett., vol. 31, pp. 223–225, 1995 and are specifically addressed to gratings inscribed in the fibres.

A third method, known as the cyclic ration variation method, is described in H. Sakata, "Side lobe suppression in grating-assisted wavelength-selective couplers", Optics Lett., vol. 17, pp. 463–465, 1992. The cyclic ratio is defined over a period of the grating as the ratio between the length of the part of the period in which the coupling coefficient is positive and the length of the part of the period in which the coupling coefficient is negative. This method varies this ratio along the path of the light.

FIG. 7 shows a grating optical filter of a type known per se in which the cyclic ratio is modified along the length of the filter.

The filter comprises a central guide flanked by portions adapted to modify the value of the coupling coefficient in the parts of the central guide level with these portions.

To be more precise, the portions of the central guide that are flanked on the right have a negative coupling coefficient and the portions of the central guide that are flanked on the left have a positive coupling coefficient.

The central guide can be considered as a succession of sections each made up of a guide part in which the coupling coefficient is negative followed by a guide part in which the coupling coefficient is positive.

In FIGS. 7 to 9 dashed lines have been drawn between the successive sections constituting the filter and the successive sections have been numbered from 1 to 8.

These sections are all the same length. In other words, the lateral portions are disposed so that each pair consisting of a righthand portion and a lefthand portion has a constant length along the guide.

FIG. 9 shows the distribution of the coupling coefficient along the filter in the direction of increasing section numbers from section 4 to section 8.

In the graph shown in FIG. 9 the abscissa axis therefore plots a distance z measured along the filter in the direction of increasing section numbers and the ordinate axis plots the value of the coupling coefficient k at the point of the guide concerned.

A section of the filter therefore consists of a succession of two sub-sections, one in which the coupling coefficient is positive and the other in which it is negative, the absolute amplitudes being substantially equal.

The sections therefore form lobes, each having the same amplitude, which is constant along the filter.

According to the cyclic ratio variation principle that is known per se, the ratio between the length of the negative lobe and the length of the positive lobe within each section is not the same for all sections of the grating.

In other words, the central sections are each divided into two substantially equal halves, one in which the coupling coefficient is negative and the other in which the coupling coefficient is positive, and the sections at the ends of the filter have a great difference in length between their negative coupling coefficient part and their positive coupling coefficient part.

As shown in FIG. 7, the section has a positive coupling coefficient part that is twice as long as its negative coupling coefficient part.

This disproportion between the positive part and the negative part of each section increases in the direction away from the centre of the device. In other words, the guide therefore has a ratio between the length of the righthand portion and the length of the lefthand portion of a pair which is maximum at the centre of the guide and progressively decreases in the direction towards the ends of the guide.

The sections therefore retain a constant length along the filter, the length of the negative coupling coefficient part progressively decreases in the direction away from the centre of the device and the length of the positive coupling coefficient part, complementary to the negative part, progressively increases in the direction away from the centre of the device.

An average coupling coefficient Km(i) defined as the average of the coupling coefficient over a section with index i has a distribution along the guide as shown in FIG. 8.

Conforming to the distribution of the cyclic ratio, the coupling coefficient Km(i) calculated in each section of index i has low values at the ends and a maximum at the centre of the guide.

This kind of distribution of the average coupling coefficient in each section is known to yield an apodised spectral response.

This method uses a constant grating height and a constant interguide distance.

This method requires control of the length of the sections that is easier to achieve than the geometrical control required in the methods previously referred to. This applies in particular to codirectional couplers, in which the grating has a pitch that is generally several tens of microns.

This method nevertheless has a major drawback, in that the devices obtained frequently cause high radiation losses.

Moreover, in devices obtained by this method, the phase lock length changes with the value of the cyclic ratio, which causes additional problems in designing the filter. These problems are discussed in H. Sakata, "Side lobe suppression in grating-assisted wavelength-selective couplers", Optics Lett., vol. 17, pp. 463–465, 1992.

Other apodisation methods similar to the cyclic ratio variation method have also been proposed. These methods are discussed in E. Shibata, S. Oku, Y. Kondo, T. Tamamura, M. Naganuma, "Semiconductor monolithic wavelength selective router using a grating switch integrated with a directional coupler", J. Lightwave Technol., vol. 14, pp. 1027–1032, 1996; Q. Guo, W. P. Huang, "Polarisation-independent optical filters based on co-directional phase-shifted grating assisted couplers: theory and decision", IEEE Proc.-Optoelectron., vol. 143, pp. 173–177, 1996; and Y. Shibata, T. Tamamura, S. Oku, Y. Kondo, "Coupling coefficient modulation of waveguide grating using sampled grating", IEEE Photonics Technol. Lett., vol. 6, pp. 1222–1224, 1994.

In one of these methods the filter is made up of parts with gratings and parts without gratings. Apodisation is effected by varying the ratio between the lengths of the parts with gratings and the lengths of the parts without gratings along the filter. FIG. 4 is a diagrammatic representation of a filter obtained by this method.

These filters have many sections with no grating and therefore have the disadvantage of a particularly great overall length.

Also, this method would not seem to be able to achieve apodisation levels of the secondary lobes greater than 20 dB.

Also known per se are methods of modifying the spectral response in which a grating is made whose period length, also known as the pitch, varies along the grating. These so-called "chirp" methods are routinely used in the manufacture of Bragg reflectors.

R. Kashyap, "Design of step chirped fibre gratings", Optics Commun., vol. 136, pp. 461–469, 1997; and D. Östling, H. E. Engan, "Broadband spatial mode conversion by chirped fibre bending", Optics Lett., vol. 1, pp. 192–194, 1996 propose such methods in which a linear or quasi-linear increasing monotonous variation of the pitch of the grating is used, with the aim of widening the spectral response of the filter. This method does not reduce the level of the secondary lobes.

FIGS. 5 and 6 show devices obtained by these methods.

In these methods, the apodisation of the secondary lobes is effected by conventional methods of varying the average coupling coefficient per section, as discussed in J. Marti, D. Pastor, M. Tortola, J. Capmany, A. Montera, "On the use of tapered linearly chirped gratings as dispersion-induced equalizers in SCM systems", J. Lightwave Technol., vol. 15, pp. 179–187, 1997.

BRIEF SUMMARY OF THE INVENTION

The main aim of the present invention is to propose a grating-type optical filter device that is apodised by a method that is not subject to the drawbacks previously discussed.

This aim is achieved in accordance with the invention by a device adapted to have an optical wave travel through it and to filter that wave in terms of wavelength, in which device an optical parameter of the device varies along the path of the wave in such a manner that the device has a series of sections each formed of two successive segments, one in which the values of the optical parameter are less that an average value and the other in which the values of the optical parameter are greater than the average value, characterized in that the device has at least one zone in which the sections have lengths alternately less than and greater than an average length of the sections in that zone.

BRIEF DESCRIPTION OF THE SEVERAL VIEWS OF THE DRAWINGS

Other features, aims and advantages of the invention will become apparent on reading the following detailed description with reference to the accompanying drawings which are provided by way of non-limiting example only in which.

DETAILED DESCRIPTION OF THE INVENTION

Figure 1:
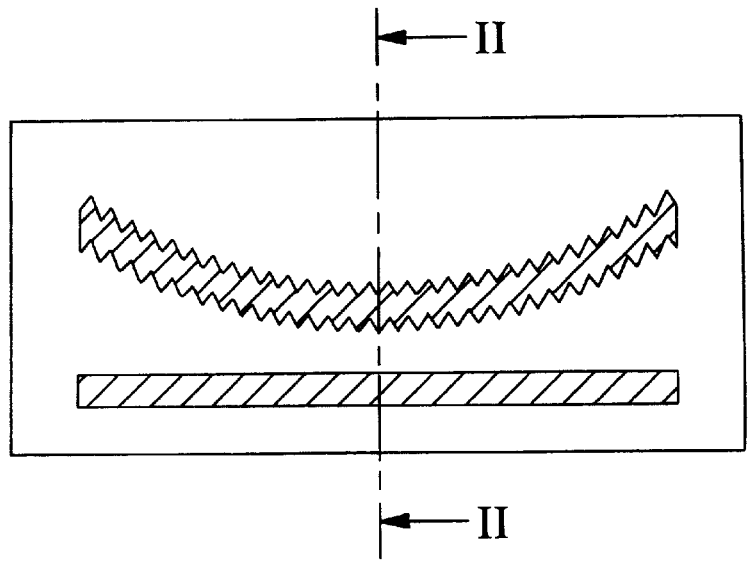
FIG. 1 is a top view of a prior art variable interguide distance codirectional coupler.
Figure 2:
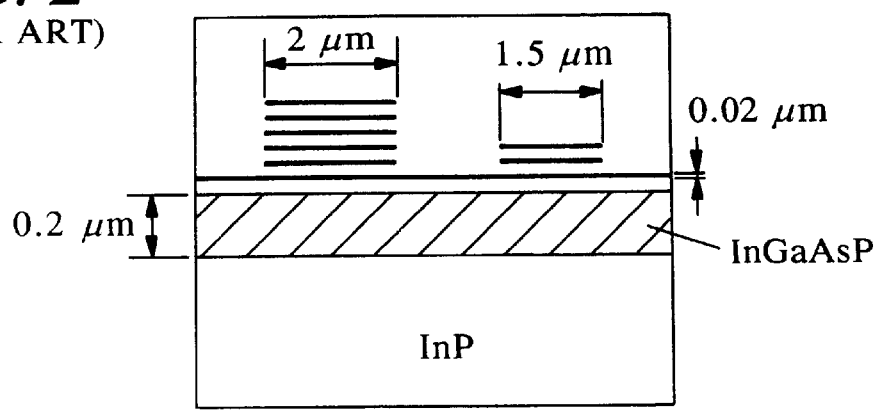
FIG. 2 is a view of the codirectional coupler from FIG. 1 in cross-section taken along the line II—II in FIG. 1.
Figure 3:
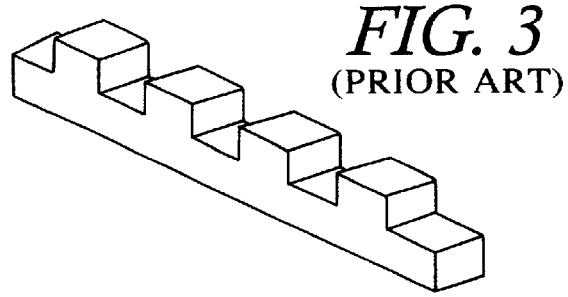
FIG. 3 is a perspective view of a prior art Bragg reflector.
Figure 4:
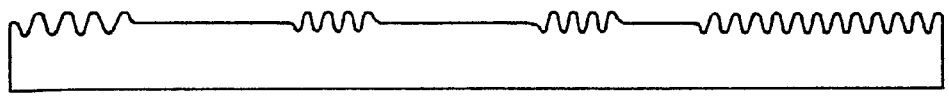
FIG. 4 is a diagrammatic view of a device conforming to the method of varying the coupling coefficient by alternating parts with and without gratings along the device.
Figure 5:
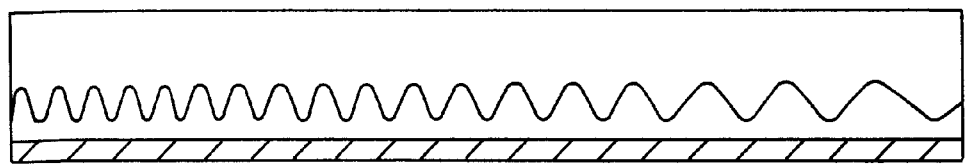
FIG. 5 is a diagrammatic representation of a device with linear variation of the pitch of the grating ("chirp")
Figure 6:
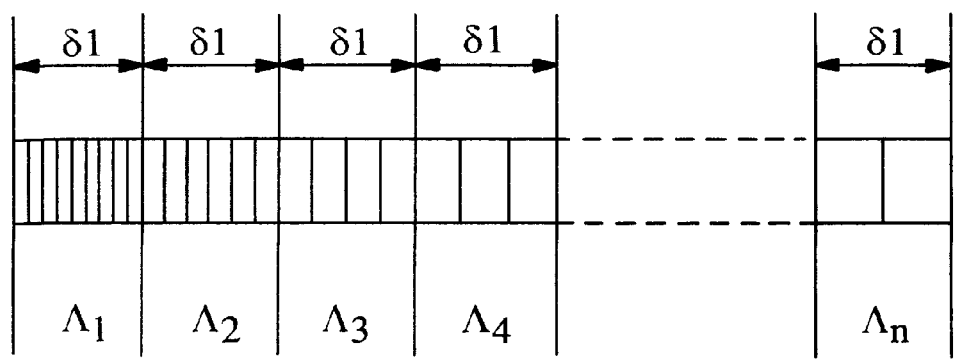
FIG. 6 is a top view of a quasi-linear prior art sampled or step chirped fibre grating.
Figure 7:
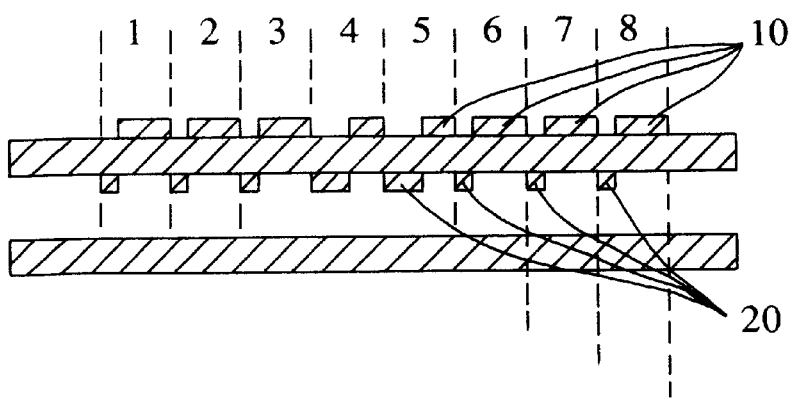
FIG. 7 is a top view of a prior art guide having alternating lefthand and righthand lateral portions.
Figure 8:
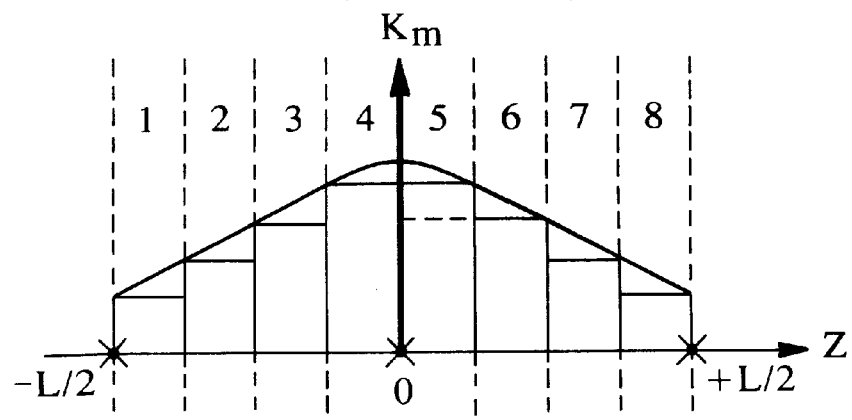
FIG. 8 is a plot of the distribution of an average coupling coefficient per section along the filter from FIG. 7.
Figure 9:
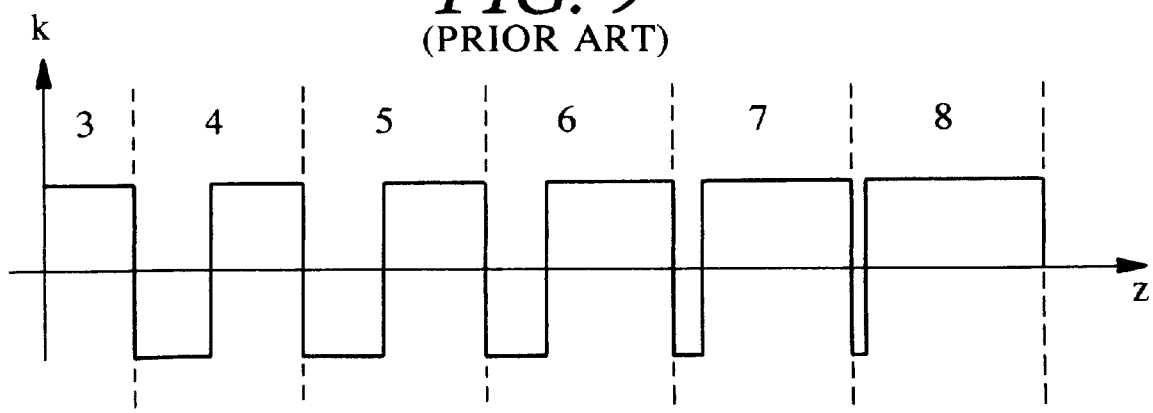
FIG. 9 is a plot of the distribution of the coupling coefficient in one half of the filter from FIG. 7.
Figure 10:
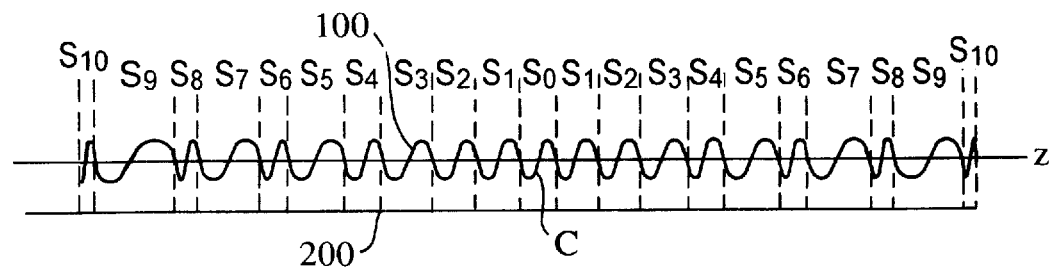
FIG. 10 is a top view of a grating-type codirectional coupler in accordance with the invention.

FIG. 10 shows a codirectional coupler in accordance with the present invention. In a manner that is known per se, this coupling includes a first waveguide 100 with undulations transverse to a longitudinal main axis Z of the guide and a rectilinear second waveguide 200 which extends parallel to the longitudinal main direction Z of the first waveguide 100.

In a manner that is known per se, coupling between the two waveguides 100 and 200 of the device produces in the first guide 100 a distribution of the coupling coefficient along the path of the light in accordance with an oscillatory function.

To be more precise, the sign of the coupling coefficient at any point of the guide 100 depends o to which side of the longitudinal main axis Z of the guide the point in question of the guide 100 is located.

In the parts of the oscillating guide 100 situated between the main axis Z and the rectilinear guide 200, the coupling coefficient is positive, while in the parts of the oscillating guide 100 that are on the opposite side of the rectilinear guide 200 to the axis Z, the coupling coefficient is negative.

In FIG. 10 sections are defined as a series of two successive portions of the filter in which the coupling coefficient respectively assumes negative values and positive values.

Given the correspondence between the sign of the coupling coefficient at a point of the guide 100 and the side of the axis Z to which that point of the guide 100 is located, a section of the guide 100 is defined in geometrical terms as being a succession of two successive lobes of the oscillating guide on opposite sides of the axis Z.

In FIG. 10, moving along the guide from a lefthand end to a righthand end sections $S_{-10}$ through $S_0$ to $S_{10}$ are separated by transverse dashed lines. Section $S_0$ is therefore a central section of the filter, section $S_{10}$ is a righthand end section and section $S_{-10}$ is a lefthand end section.

The set of sections $S_0$ through $S_{10}$ therefore constitutes a righthand half of the guide.

Figure 11:
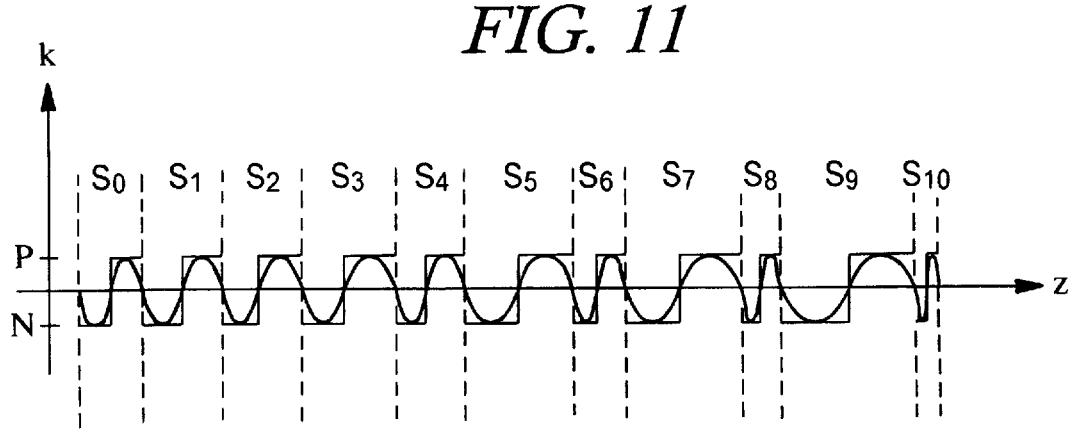
FIG. 11 is a plot of the distribution of the coupling coefficient along the filter from FIG. 10.

FIG. 11 is a plot of the variation in the coupling coefficient along the path of the light in the half of the filter consisting of the segments $S_0$ to $S_{10}$.

The distribution of the coupling coefficient in the other half of the filter is not shown but can easily by deduced from the FIG. 11 plot by the skilled person from considerations of symmetry.

In FIG. 11 a distance z measured along the filter is plotted on the abscissa axis and the value k of the coupling coefficient at the point concerned along the filter (with abscissa z) is plotted on the ordinate axis.

There is a direct correspondence between FIG. 10 representing the filter in accordance with the invention and FIG. 11 representing the variation of the coupling coefficient along the filter.

The distribution of the sections along the plot of the filter 11 is therefore also shown by transverse dashed lines.

The device from FIG. 10 and the plot of the distribution of the coupling coefficient from FIG. 11 are therefore each divided into sections, the two subdivisions into sections corresponding to each other.

The inventors have discovered that by adopting a particular distribution of the lengths of the sections along the filter, a spectral response is obtained whose secondary lobes are significantly attenuated compared to the spectral response of a correspondingly conventional filter, that is to say a filter having substantially the same average length of the sections but not this particular distribution.

The expression "pitch of the grating" is routinely used to refer to the constant length of the successive sections. In the remainder of this description "pitch" will also be used to denote a section length of the filter, although in the context of the invention this "pitch" is not constant throughout the filter. The sections in FIGS. 10 and 11 therefore have different pitches.

This particular distribution of the lengths of the sections in accordance with the invention will now be described.

As can be seen in FIGS. 10 and 11, the lengths of the sections are such that a short section and a long section alternate along the length of the guide. In other words, the length of a section varies in an oscillatory manner along the grating.

To be more precise, in FIG. 10, if any group of successive sections is chosen and the average length of the sections of that group determined, the sections in the group have lengths that alternate around the average length of the sections of the group.

In other words, along the filter in this group of chosen sections, a section having a length less than the average length is followed by a section having a length greater than the average length which is followed by a section having a length less than the average length, and so on.

In any part of the filter from FIG. 10 the sections have a distribution of their lengths along the filter that oscillates about an average section length.

Figure 12:
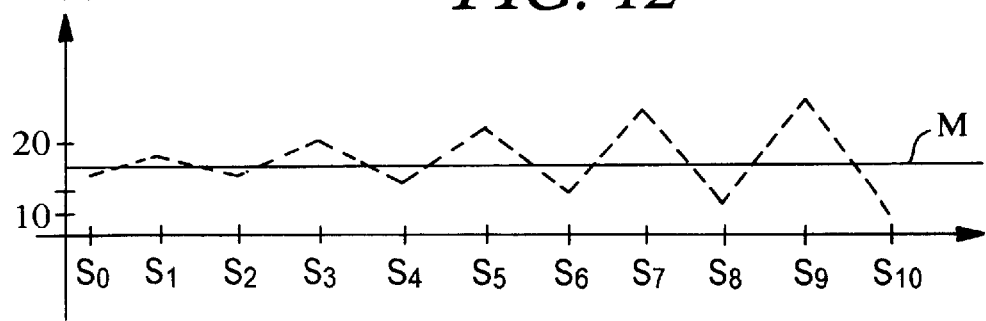
FIG. 12 is a plot of the distribution of the length of the sections along the filter from FIG. 10.

FIG. 12 is a plot of the distribution of the lengths of the sections along the righthand half of the filter from FIG. 10.

The references of the successive sections $S_0$ to $S_{10}$ are plotted on the abscissa axis and the length of each of the sections $S_0$ to $S_{10}$ on the ordinate axis.

FIG. 12 shows a horizontal straight line whose ordinate M corresponds to the average length of the sections $S_0$ to $S_{10}$.

The plot is seen to oscillate, i.e. the lengths of the sections are alternately less than of greater than the average value. The points corresponding to two successive sections are alternately connected by a rising segment and by a falling segment.

It is not necessary in accordance with the invention for the lengths of the sections to oscillate over the whole of the grating. This oscillatory distribution proves to be equally advantageous when applied to only a portion of the grating.

The inventors have discovered that by causing the length of the sections to oscillate around an average value over at least part of the guide of an optical grating a spectral response is obtained that is significantly improved compared to that of a similar guide in which no portion has this characteristic.

The inventors have compared a first grating-type filter in which the coupling coefficient oscillates in the conventional manner along the grating, that is to say in which the length of the sections is constant along the filter, and a second filter similar to the first one except that is had a part of the grating in which the lengths of the sections alternate about an average value.

They found that the spectral response of the second filter had secondary lobes significantly attenuated compared to those of the first filter.

The distribution of the lengths of the sections over a part of this kind advantageously has an additional feature in that the lengths of the sections oscillate about an average length with an amplitude of oscillation that increases along that part in the direction away from the centre of the filter.

Thus, in FIG. 12, the central section $S_0$ has a length substantially equal to the average length M of the sections, the sections $S_1$ and $S_2$ have lengths that depart relatively little from the average length M, but the sections $S_9$ and $S_{10}$ near the righthand end of the guide have lengths greatly different from the average length M of the sections.

The lengths of the sections $S_0$ to $S_{10}$ thus alternate about the average length M with a difference relative to the latter which increases away from the centre C of the guide.

In other words, if the difference between the length of each section $S_0$ to $S_{10}$ and the average length M of the sections $S_0$ to $S_{10}$ is measured, the absolute value of the difference increases over all of the part of the device from section $S_0$ to section $S_{10}$.

As shown in FIG. 12, the value of the ratio of the lengths of two successive sections, i.e. the ratio of the greater length to the lesser length, increases from the centre of the filter to one end.

The inventors have found that the apodisation of the filter is improved by having in the filter at least one part in which the sections have lengths which oscillate with absolute difference relative to the average of the lengths in that part which increases along that part in the direction away from the centre of the filter.

In the preferred embodiment described here with reference to FIGS. 10 to 12, the difference between the length of a section concerned and the average length of the sections starts from the value 0 at the centre of the device and reaches a maximum in the end section $S_{10}$.

The fact that the absolute difference between the length of each section and the average length of the sections increases monotonously from the centre of the device and as far as the end of the filter, that is to say over all of at least one half of the filter, is an advantageous arrangement for obtaining a clearly apodised spectral response.

It is not necessary for the difference to reach a maximum at the ends of the filter, although this is advantageous in terms of apodisation quality.

Moreover, it is not necessary either for the sections from the centre to have lengths equal to the average lengths of the sections over the filter, in other words for the previously defined difference to be 0 at the centre of the device, although this is advantageous in terms of apodisation quality.

In the preferred embodiment described here the absolute difference in length between a section considered and the average length increases linearly from the centre of the filter to each end thereof.

The lengths of the sections therefore oscillate about the average length with an amplitude that increases linearly from the centre of the device to each end of the filter.

Here the distribution of the lengths of the sections is given by the equation $l(s)=l_0\times(1+\epsilon(s)\times(-1)s)$ in which $l(s)$ is the length of a section of index s where s corresponds to a section number from 1 to N of the grating from one end of the grating to the other and where $l_0$ is the average length of the sections of the grating and $_\epsilon(s)$ is the difference of the length of a section S relative to the average length $l_0$.

$_\epsilon(s)$ is given by $_\epsilon(s)=c\times(2\times(s-0.5-(N/2))/N)$, N being the total number of sections of the grating and c being a constant.

Referring to the "chirp variation" method know per se, c denotes chirp although in the prior art method the lengths of the sections do not have an oscillatory distribution but an increasing monotonous distribution or a decreasing monotonous distribution.

The skilled person will know how to apply the above equation to the production of other grating-type filters, in particular filters conforming to the coupled mode formalism, i.e. gratings which are the site of variations of the coupling coefficient along the path of the light.

An apodised device in accordance with the invention can easily be obtained from a grating known per se by slightly modifying the distribution of the lengths of the sections along the grating.

Starting with a conventional non-apodised grating, the skilled person will know exactly how to identify the sections conforming to the definition given above with reference to the distribution of the coupling coefficients and how to determine the average length $l_0$ of the sections of the conventional grating.

The skilled person will then be in a position to produce a device in accordance with the invention with a grating similar to the conventional grating except that the length of the sections oscillates along the grating, for example in accordance with the equations proposed above. Using the distribution equations given above, the skilled person has only to adopt a chirp value c suited to the nature and to the size of the grating to obtain a spectral response that is efficiently apodised compared to that of the original grating.

Figure 13:
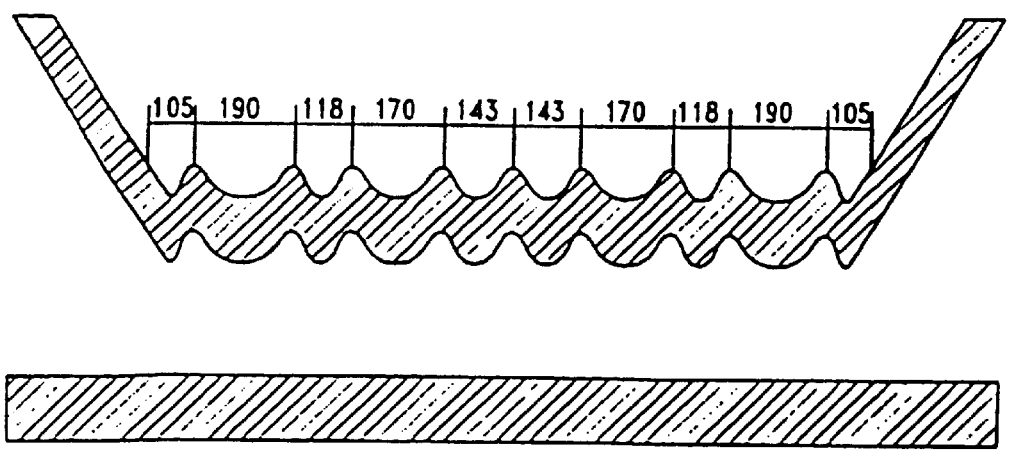
FIG. 13 is a top view of an apodised interguide distance oscillation filter in accordance with the invention.

FIG. 13 shows a codirectional coupler in accordance with the invention made from a conventional non-apodised codirectional coupler having an average section length $l_0$, also referred to as the "average value of the pitch of the grating", equal to 150 $\mu$m.

Figure 15:
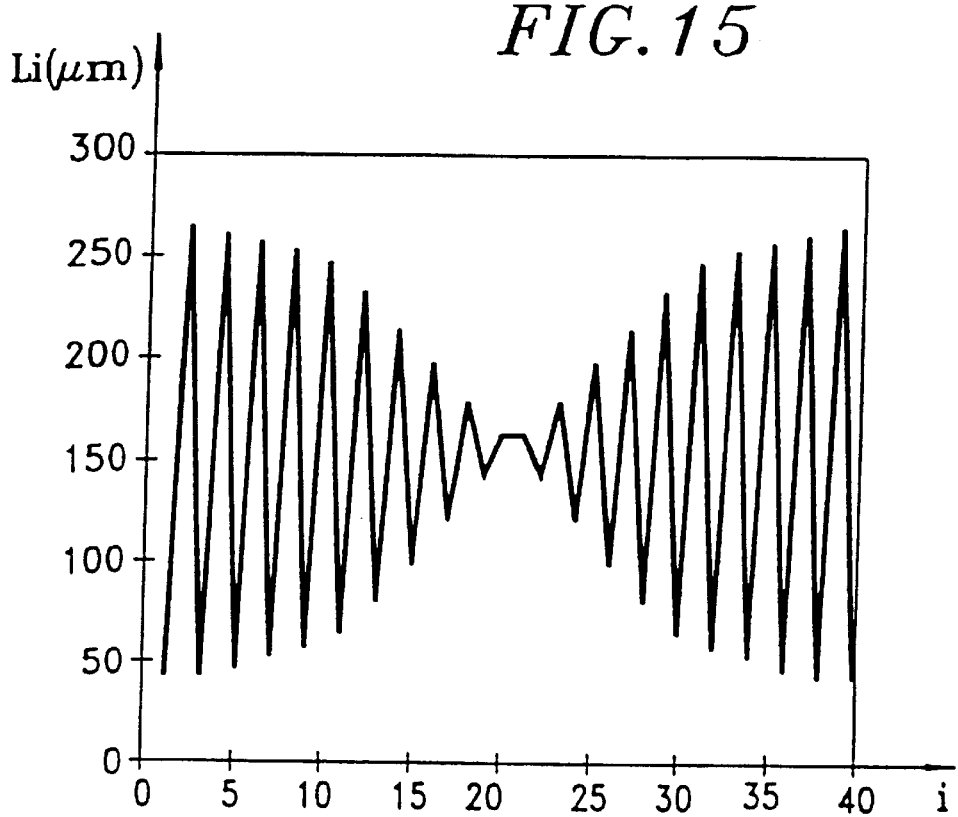
FIG. 15 is a plot of the distribution of the lengths of the sections in an apodised codirectional coupler in accordance with the present invention.

FIG. 15 is a plot of the distribution of the lengths of the sections along a grating of a codirectional coupler similar to that from FIG. 13, this time with 40 sections.

The apodised codirectional coupler in accordance with the invention has a section length l(s) distributed along the grating in accordance with the equation:

$$l(s)=l_0\times(1+_\epsilon(s)\times(-1)s)$$

where $l_0$ is the length of the pitch of the grating of the original non-apodised coupler and $_\epsilon(s)$ is the relative variation of the pitch of the grating and is given by: $_\epsilon(s)=c.\sin(\pi.(s-0.5-N/2)/N)$. The average length of the sections of the grating is equal to 150 $\mu$m. Here the coefficient c is equal to −0.72 (72%).

In the FIG. 15 plot the sections are numbered from 1 to 40 from one end to the other of the grating. The lengths Li in micrometers of sections with index i are plotted on the ordinate axis.

Figure 16:
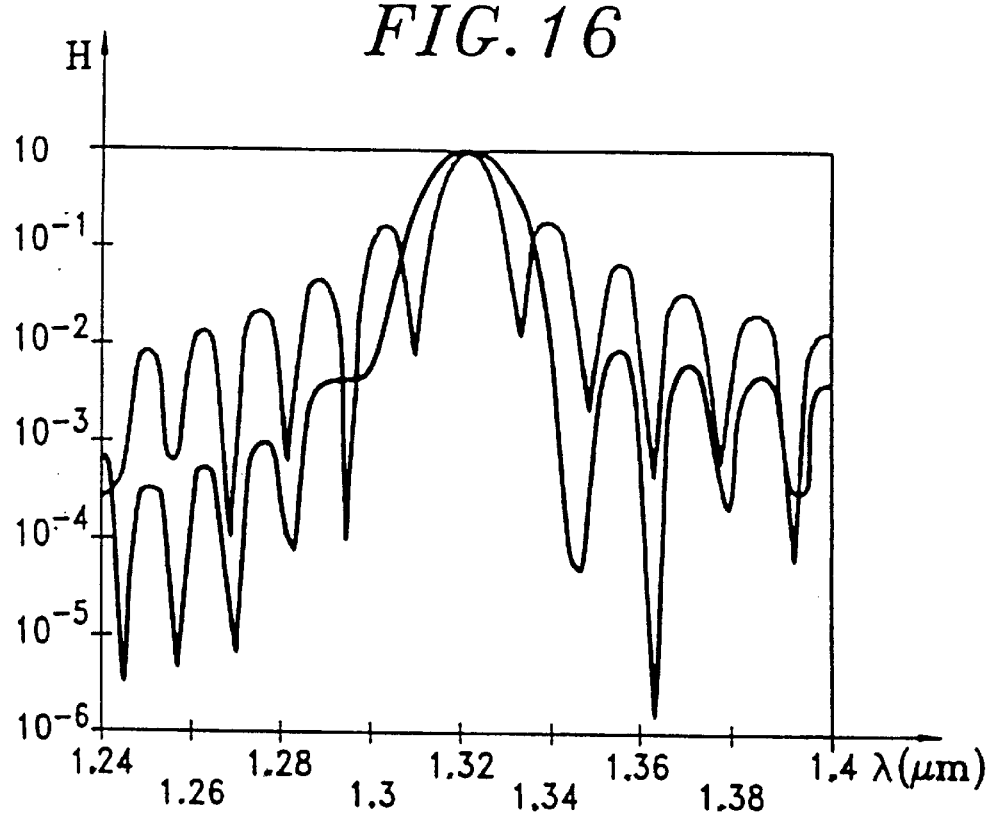
FIG. 16 is a plot of the spectral response of the same codirectional coupler and the spectral response of a corresponding non-apodised codirectional coupler.

FIG. 16 shows in continuous line the spectrum of a codirectional coupler with 40 sections in accordance with the invention and in dashed line the spectrum of a similar codirectional coupler except that is has a constant grating pitch equal to 150 $\mu$m.

Note that the secondary lobes of the spectrum of the apodised coupler are of significantly reduced amplitude. In this embodiment the apodisation of the first secondary lobes is in the range 20 dB to 30 dB.

More generally, for a codirectional coupler, application of the preceding equation with a chirp coefficient c in the range −1 to 1 produces apodisation of the first secondary lobes in the range 20 dB to 30 dB.

The inventors have also made a Bragg reflector in which the lengths of the sections are distributed in an oscillatory manner with an amplitude distributed linearly in accordance with the equations:

$$l(s)=l_0(1+_\epsilon(s)(-1)s)$$

and $$_\epsilon(s)=c(2(s-0.5-(N/2))/N)$$

Figure 17:
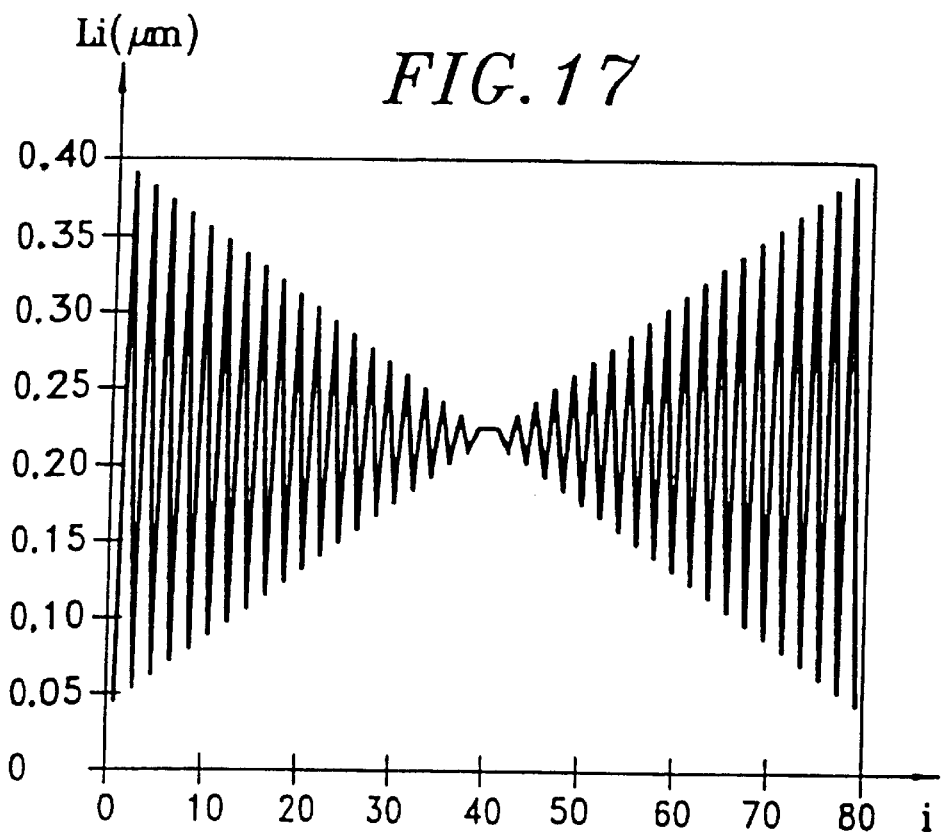
FIG. 17 is a plot of the distribution of the length of the sections in a Bragg reflector with 80 sections in accordance with the present invention.

FIG. 17 shows a plot of the distribution of the grating pitch of a Bragg reflector of the above kind with 80 sections, a chirp coefficient c equal to −0.85 and an average section length of 0.22 $\mu$m.

Figure 18:
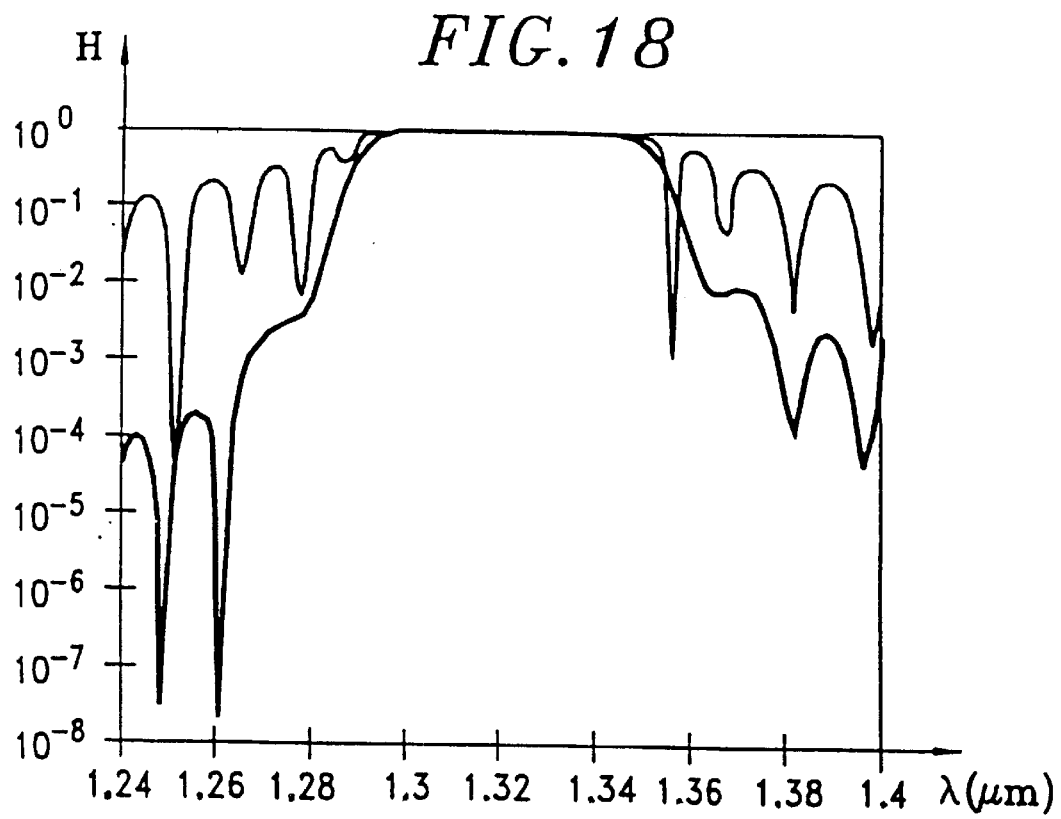
FIG. 18 is a plot of the spectral response of the same Bragg reflector and of the spectral response of a corresponding non-apodised Bragg reflector.

FIG. 18 shows the spectrum of a Bragg reflector of the above kind in continuous line and, in dashed line, the spectrum of a Bragg reflector with a constant section length equal to 0.22 $\mu$m. The apodisation of the secondary lobes is in the order of 30 dB to 50 dB.

Figure 19:
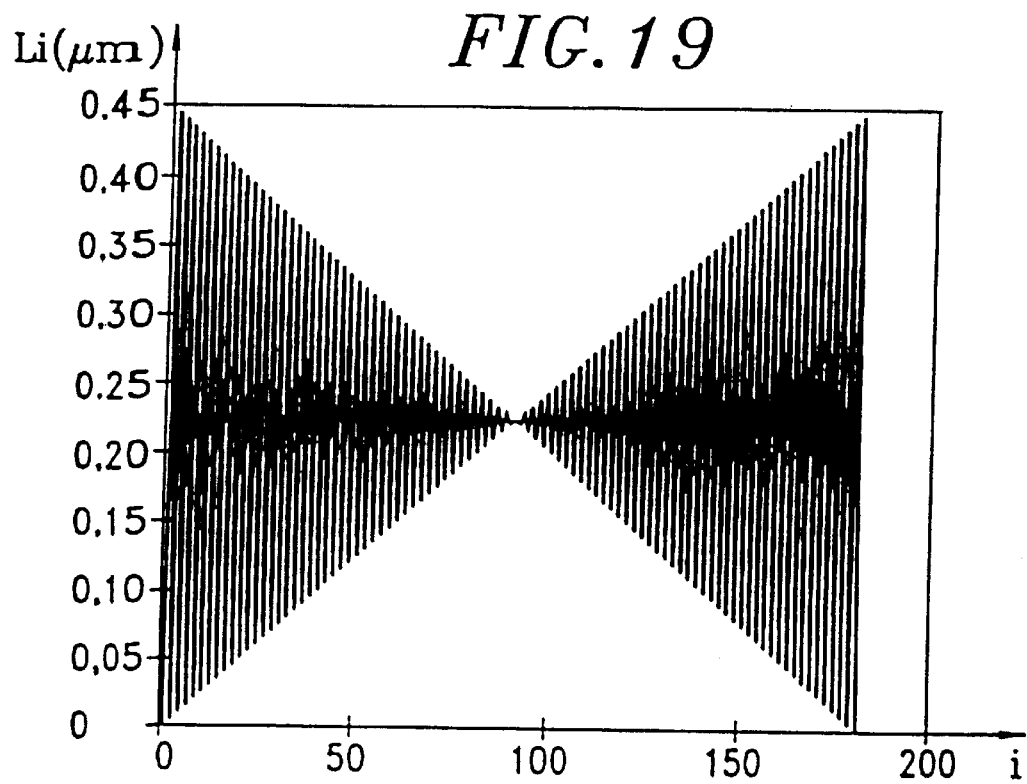
FIG. 19 is a plot of the distribution of the lengths of the sections in a Bragg reflector in accordance with the invention having 180 sections.

FIG. 19 shows a distribution of the lengths of the sections with the amplitude linearly increasing from the centre of the device in a Bragg reflector having 180 sections, an average section length of 0.22 $\mu$m over the whole of the reflector and a chirp coefficient c of −0.98.

Figure 20:
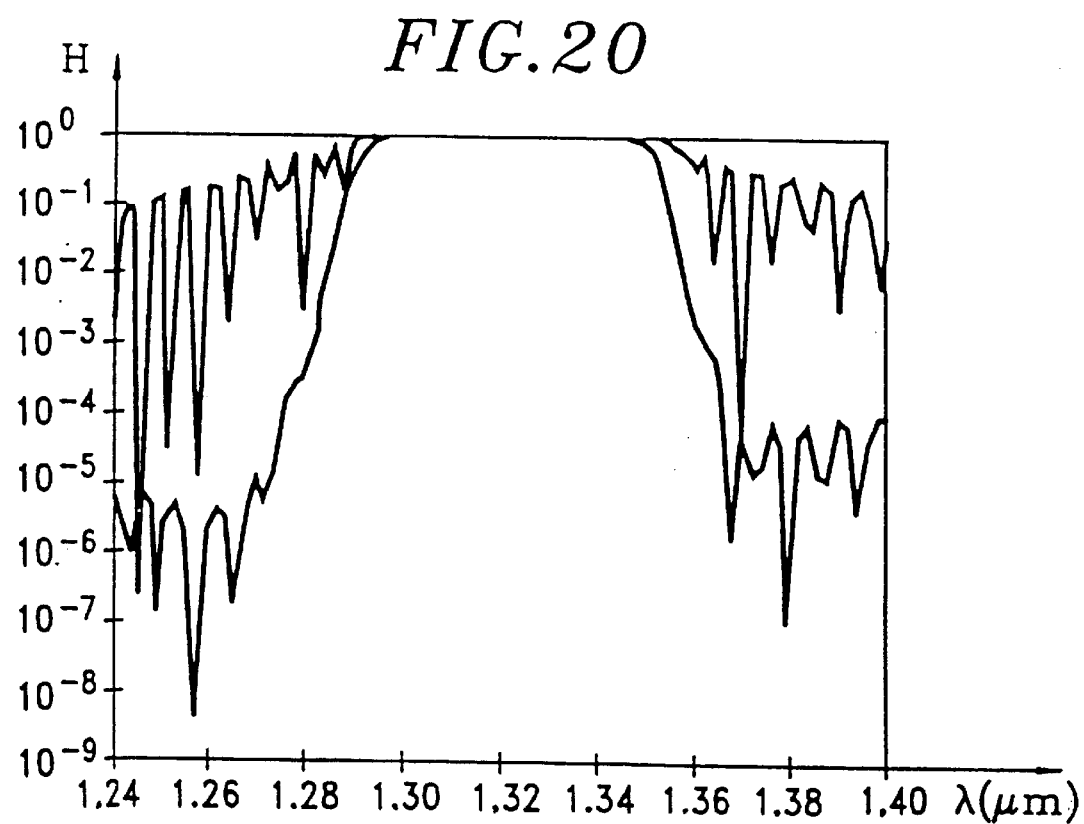
FIG. 20 is a plot of the spectral response of the Bragg reflector from FIG. 19. and spectral response of a corresponding non-apodised Bragg reflector.

FIG. 20 shows the respective spectra of the apodised Bragg reflector and a Bragg reflector with the same average section length in which the sections have a constant length equal to the average. Once again the apodisation of the secondary lobes is in the range 30 dB to 50 dB.

FIGS. 18 and 20 show that Bragg reflectors in accordance with the invention show no widening of the spectrum compared to the original conventional type reflector, in contrast to the effect obtained with a variation of the lengths of the sections using the chirp method. The device in accordance with the invention even has a spectral width that is slightly smaller than that of the corresponding non-apodised device.

The invention is not limited to the embodiments described hereinabove concerning devices conforming to the coupled mode formalism, in which the optical parameter varying along the grating is the coupling coefficient.

It is more generally addressed to devices constituting optical filters and having a grating, in other words devices in which an optical parameter alternating about an average along the path of the light is a parameter other than the coupling coefficient.

Nor is the invention limited to devices in which oscillations of the optical parameter result from geometrical variations of the device along the path of the light.

Generally speaking, the skilled person will be able to identify within many optical devices a variation of an optical parameter along the path of the light that is suitable for constituting a series of consecutive sections, where a section is defined as a part comprising two consecutive segments, one in which the parameter assumes values above an average value of the parameter and the other in which the parameter assumes values below the average value of the parameter.

Using an oscillatory distribution of the section lengths in such devices produces devices in which the spectral response shows a clear apodisation relative to a device in which the sections have lengths without this distribution.

Figure 14:
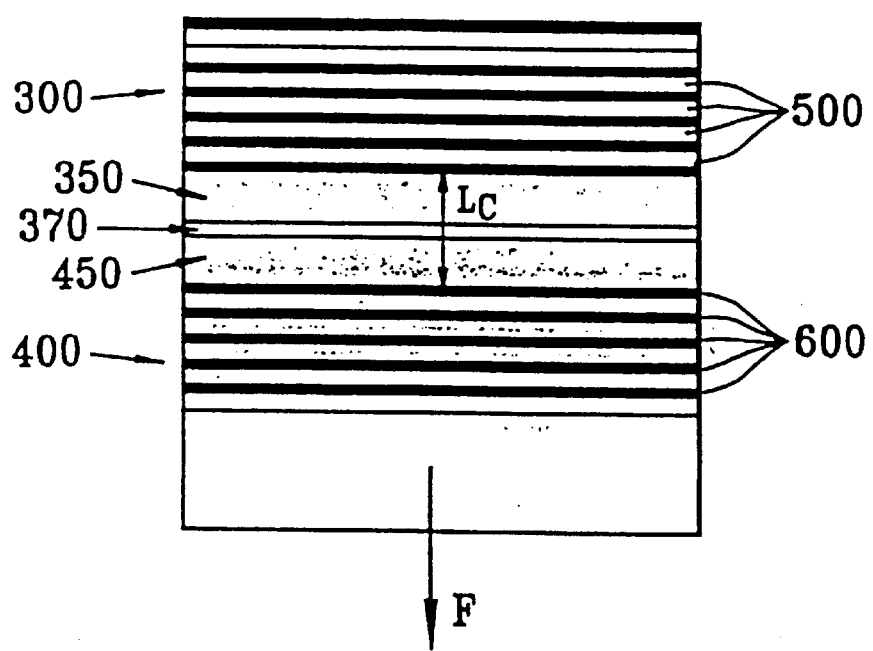
FIG. 14 shows a cross-section of a vertical cavity laser with Bragg mirrors formed by alternating layers of AlAs and GaAs.

Thus the invention is addressed, for example, to the implementation of a vertical cavity VCSEL laser. As shown in FIG. 14, a device of this kind contains two Bragg mirrors 300 and 400 each consisting of an alternating succession of AlAs layers 500 and GaAs layers 600.

Between the two Bragg mirrors 300 and 400 are two spacing layers 350 and 450 between which is sandwiched an active layer 370.

In FIG. 14 the arrow F shows the direction in which light passes through the device.

Within the Bragg mirrors the refractive index oscillates about an average value along the path of the light. This is known per se.

The oscillating parameter here is the refractive index. A pair of layers, one of AlAs and the other of GaAs, is the site of a variation in the refractive index comprising a high index part and a low index part, each of these layers constitutes a section conforming to the definition given hereinabove.

An oscillatory distribution of the lengths of these sections over at least a part of the mirror, measured parallel to the path of the light, that is to say in this application an oscillatory distribution of the thickness of an AlAs/GaAs pair of layers, achieves a significant improvement in terms of the wavelength selectivity of the mirror concerned compared to a mirror with a constant thickness of the pairs of layers and the same average value of the thickness of the pairs of layers.

In the preamble of the description a method known per se of widening the spectral response known as the "chirp method" is described. In this method, the length of the section varies monotonously in accordance with a generally linear function defined by the following equations:

$$l(s) = l_0(1 + \epsilon(s))$$

$$\epsilon(s) = c(2(S - 0.5 - N/2)/N)$$

In devices corresponding to the chirp method known per se, and in devices in accordance with the present invention, c represents the maximum difference between the length of a section and the average length of the sections divided by the average length of the sections of the grating.

Thus c represents the maximum deviation of the length of the sections from the average length of the sections, this difference being divided by the average length of the sections to yield a relative mean deviation. The chirp coefficient c used in the Bragg reflector in accordance with the invention previously described therefore has a value that is 1 to 2 orders of magnitude greater than the values of the coefficient c generally used in the prior art chirp method.

In this prior art method the chirp coefficient therefore has a much lower value that the values of c used in the devices in accordance with the invention described here.

The invention therefore has the advantage that to effect apodisation of a filter such as a Bragg reflector large chirp values are used that render the filter less sensitive to manufacturing errors and inaccuracies.

As can be seen in FIG. 11, within each section the segment in which the coupling coefficient is negative and the segment in which the coupling coefficient is positive are the same length.

Accordingly, considering within the group of sections $S_0$ to $S_{10}$ the lengths of the segments with a positive coupling coefficient (more generally, the segments in which the value of the optical parameter is greater than an average value of that parameter over a zone of the filter running from $S_0$ to $S_{10}$), the segments have a distribution of their length that oscillates over the group of sections about an average length of the segments with positive values of the optical parameter.

In other words, the segments with positive values of the coupling coefficient have, along sections $S_0$ to $S_{10}$, lengths alternately less than and greater than an average length of the segments, on passing from a segment with positive values to the next segment with positive values.

Similarly, the segments with negative coupling coefficients also have a distribution of their lengths that alternates about an average length of the negative coefficient segments on passing from a segment with negative values to the next segment with negative values.

Thus, in the case of the device from FIG. 11, the sections are each made up of two segments, one with positive values of the coupling coefficient and the other with negative values of the coupling coefficient, and each of these two types of segment has an oscillatory distribution of lengths along the filter.

To be more precise, sections in which both segments have short lengths alternate with sections in which both segments have long lengths.

More generally, in a grating-type device, a zone is advantageously adopted in which the distribution of the lengths of sections and of segments constituting those sections is such that the segments with values of the optical parameter higher than an average over the zone have lengths that alternate about an average length of the segments. This arrangement is likewise advantageously adopted for the segments with values of the optical parameter less than an average over the zone.

Here, each of the sections is made up of two segments of substantially equal length, one in which the coupling coefficient is positive and the other in which the coupling coefficient is negative.

But it is clearly not necessary in devices in accordance with the invention to vary the average coupling coefficient in each section.

It is nevertheless possible to produce a device in which the segments in which the coupling coefficient is positive (respectively negative) remain of constant length from one section to another and in which only the lengths of the segments in which the coupling coefficient is negative (respectively positive) have an oscillatory type distribution. In this case, the lengths of the pitches of the grating, which are the sums of the lengths of two consecutive segments, one in which the coefficient is positive and the other in which it is negative, have on oscillatory type distribution in accordance with the invention.

As the ratio between the lengths of the two subsections is no longer along the device in this case, the cyclic ratio is varied and consequently the average coupling coefficient per section is varied.

An implementation in which the segments in which the coupling coefficient is positive have the same oscillatory type distribution as the segments in which the coefficient is negative is nevertheless more advantageous in terms of spectral response quality. In other words, it is preferable not to vary the cyclic ratio of the coupling coefficient within the grating.

Moreover, in the device from FIGS. 10 to 12, the segments with positive values of the coupling coefficient have a distribution of their lengths that oscillates with increasing amplitude in the direction away from a central part of the device. Similarly, the segments with negative coupling coefficient values also have this kind of distribution.

More generally, the inventors have found that for a grating-type device, that is to say a device in which an optical parameter varies along the grating in accordance with a division into sections, it is advantageous in terms of spectral response quality to implement a device of the above kind by adopting for the length of the segments with values of the optical parameter greater than the average value M of the parameter over a group of sections with lengths oscillating about an average length of the segments with an amplitude that increases in the direction away from a central part of the device.

Similarly, the lengths of the segments in which the optical parameter is below the average value of that parameter advantageously have this kind of distribution, i.e. the lengths of these segments with values of the optical parameter less than an average value M of the parameter oscillate about an average length of the segments with an amplitude that increases in the direction away from a central part of the device.

As previously indicated, the sub-sections or segments of each section of the device in accordance with the invention, which have values respectively greater than and less than an average value of the optical parameter, are preferably the same length within the same section, in contrast to devices implemented using the cyclic ratio variation method.

It is therefore unnecessary to introduce any precise variation of the ratio between the lengths of the two sub-sections within the successive sections. Thus the average coupling coefficient calculated for each section remains constant from one section to another.

Implementing a filter of the above kind in accordance with the invention necessitates only control of the lengths of the sections, without any exacting requirement for a particular distribution of the values of the coupling coefficients. The sections having dimensions greater than the sub-parts of the sections mentioned above, compliance with dimensions in the fabrication of a filter of the above kind is therefore easier and so fabrication is more reliable than in the case of filters with variation of the cyclic ratio.

Accordingly, in the method of implementing a grating in accordance with the invention, the modulation over the pitch of the grating is particularly easy to control, especially in the case of codirectional couplers where the pitch of the grating is generally high, typically several tens of microns.

A filter in accordance with the invention can equally be fabricated without the errors that arise in devices in which a variation in the interguide distance must be controlled, such as grating-type codirectional and contradirectional couplers.

The method of making a grating in accordance with the invention enables simple production of vertical codirectional and contradirectional couplers and gratings on fibres.

Accordingly, the method of making a filter in accordance with the invention applies to any device in which there is a periodicity of an optical parameter analogous to that of a grating.

Among devices that have been described using the coupled mode formalism, the inventors have succeeded in apodisation of the secondary lobes of a Bragg mirror such as those which constitute the Bragg mirror from FIG. 14.

Such apodisation is particularly attractive for producing, for example, a reflector at one wavelength having good transmission at a second wavelength. Simulated spectra of such Bragg mirrors are plotted in FIGS. 21 and 22.

Figure 21:
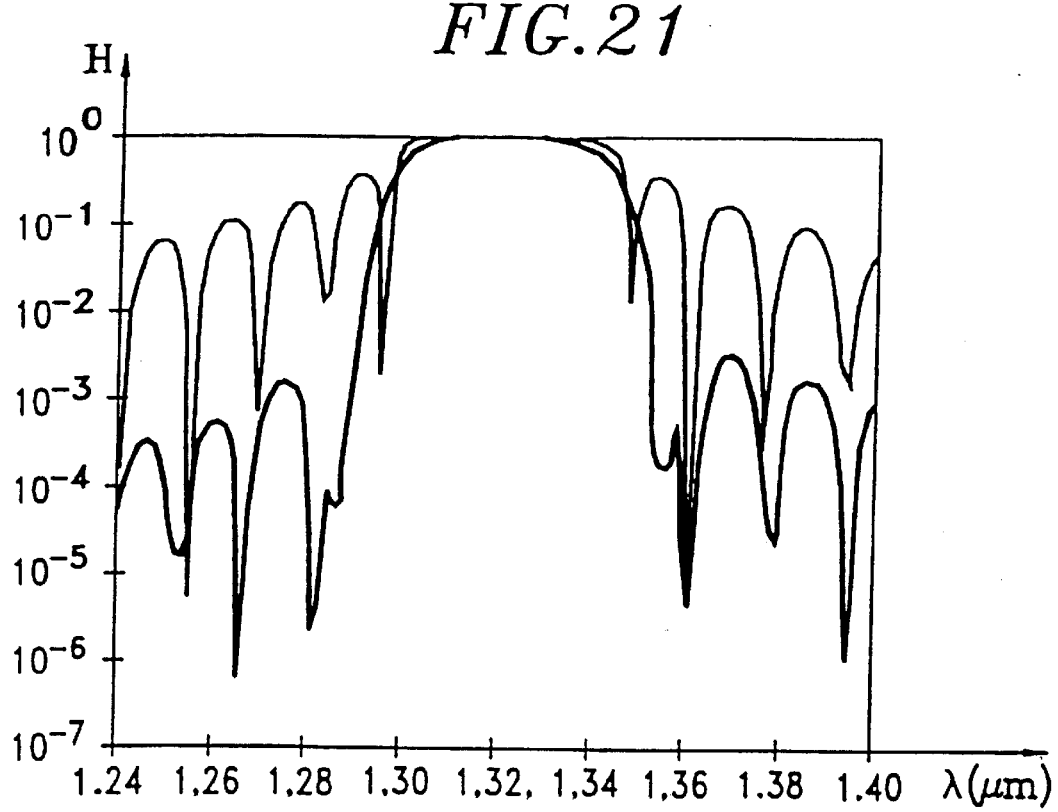
FIG. 21 is a plot of the spectral response of a Bragg mirror with 80 two-layer pairs in accordance with the invention and of a corresponding non-apodised Bragg mirror.

FIG. 21 plots in continuous line the simulated spectrum of a Bragg mirror made up of 80 pairs of two layers of two materials having indices of 3.22 and 3.38. To be more precise, the spectrum of a reflector of the above kind is plotted in which the thickness of the two layers varies in accordance with the equations:

$$l(s)=l_0(1+\epsilon(s)(-1)s)$$

and $$\epsilon(s)=c(2(S-0.5-N/2)/N)$$

with a chirp coefficient of c=−0.8.

The same figure shows in dashed line the simulated spectrum of a similar Bragg mirror having a uniform distribution of the lengths of the sections. The figure shows the particularly high level of apodisation obtained using the invention. This example simulated in particular a real situation of an epitaxially grown Bragg mirror for a VCSEL laser, an application for which a mirror of the above kind is particularly suitable.

Figure 22:
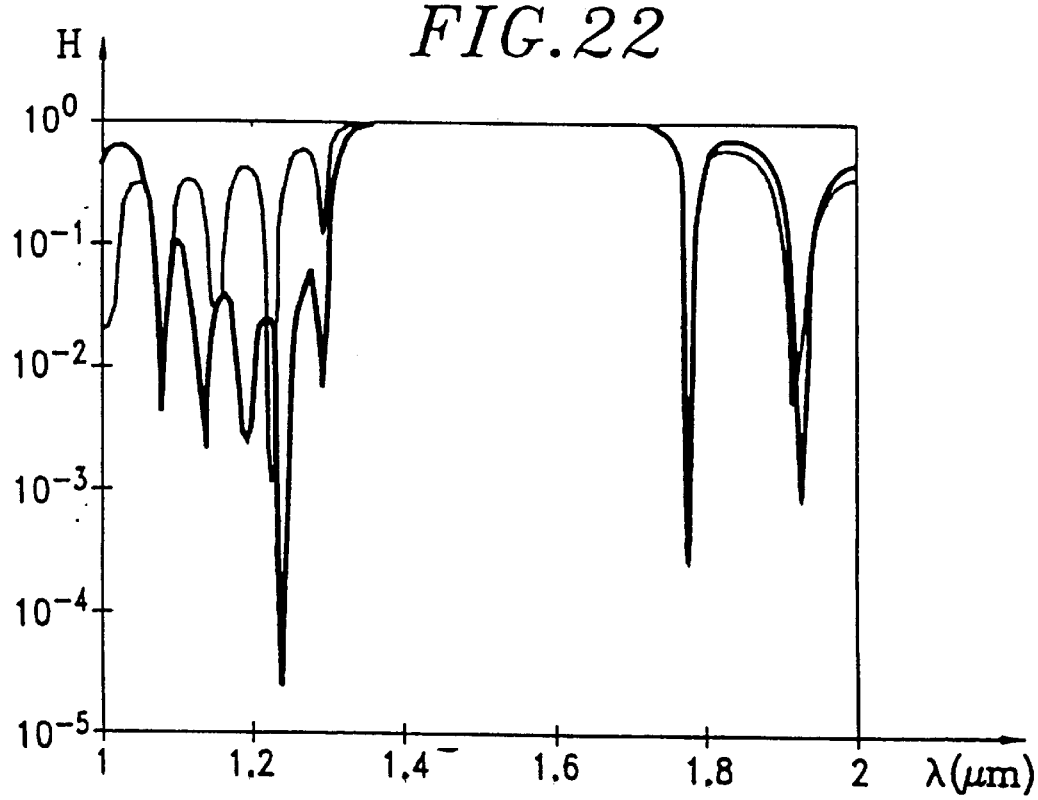
FIG. 22 is a plot of the spectral response of a Bragg mirror with ten layers in accordance with the invention and of a corresponding non-apodised Bragg mirror.

FIG. 22 plots a simulated spectrum for a stack of only ten two-layer pairs having indices of 1.46 and 2.2. The variation in the thickness of the two-layer pairs is in accordance with the same equations as previously, with a chirp coefficient c=−0.25. This embodiment of the invention is particularly suitable for making a dielectric mirror based on $SiO_2$ and $TiO_2$.

In the apodisation methods previously mentioned, the method of varying the cyclic ratio varies the average value of the coupling coefficient in each section.

In the embodiments of the invention previously described the mean value of the coupling coefficient in each section remains constant and it is only in the context of a coupling coefficient defined separately in each section that it can be said that the average coupling coefficient per section is constant.

The average coupling coefficient of a section can be defined more precisely as the first Fourier coefficient over a period of the grating of the Fourier transform of the coupling coefficient.

How to determine the average coupling coefficient per section in the case of any grating conforming to the coupled mode formalism is explained hereinafter.

Figure 23:
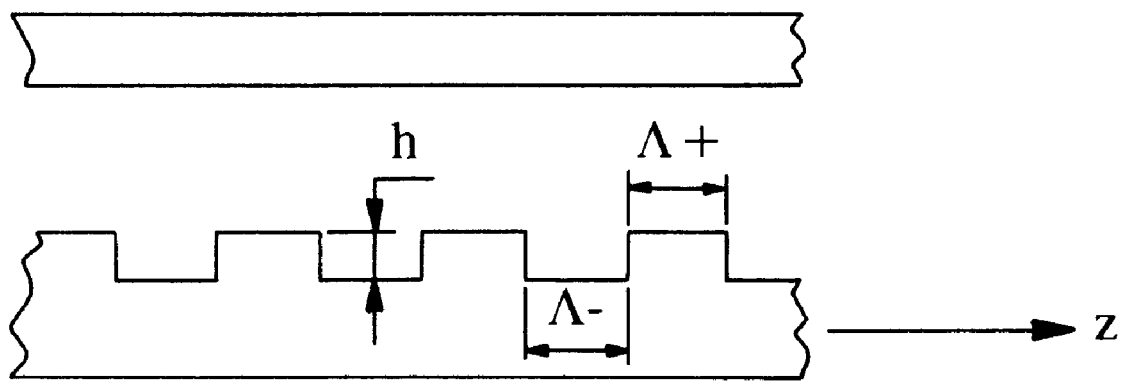
FIG. 23 is a side view of a prior art codirectional coupler with a rectangular grating.

Consider the example of a codirectional coupler with a rectangular grating like that shown in FIG. 23. The refractive index n given her of a coupler of the above kind can be expressed by the equation:

$$n^2(x,y,z)=\underline{n}^2(x,y)+\eta^2(x,y)*f(z)$$

in which n is the index of the uniform structure and η is the periodic disturbance (which in the most general case varies in accordance with f(z), in the case of a meander in the example given here). In this case the coupling coefficient is expressed by the following equation:

$$k_{ij}(z) = \frac{1}{4}\omega\varepsilon_0 \int (\eta(x, y))^2 f(z) e_i * e_j dx dy$$

which represents an integral of overlapping of two modes $e_1$ and $e_2$ in the zone of the grating. The derivation of the last two equations is described in Q. Guo, W. P. Huang, "Polarisation-independent optical filters based on codirectional phase-shifted grating assisted couplers: theory and decision", IEEE Proc.-Optoelectron., vol. 143, pp. 173–177, 1996. It is possible to decompose $n^2$ into Fourier series over a grating period Λ.

$$n^2 = \eta^2(x, y) \sum_{m=-\infty}^{m=+\infty} F^{(m)} \exp\left(i\frac{2m\pi}{\Lambda}z\right)$$

where $F^{(m)} = \frac{1}{\Lambda} \int_{-\Lambda/2}^{\Lambda/2} f(z) \exp\left(-i\frac{2m\pi}{\Lambda}z\right) dz$ For a meandering grating such as that from FIG. 23, the Fourier coefficients are given by:

$$F^{(m)} = \frac{h}{m\pi} \sin\left(\frac{m\pi\Lambda}{\Lambda}\right)$$

The Fourier series development of the coupling coefficient is expressed:

$$k(z) = \sum_{m=-\infty}^{m=+\infty} \chi^{(m)} \exp\left(-i\frac{2m\pi}{\Lambda}z\right)$$

and $\chi^{(m)} = \frac{1}{4}\omega\varepsilon_O F^{(m)} \int \eta^2(x, y) e_1 e_2^* dx dy$ The effective indices of the two guides being different, light is propagated with a different speed in the two guides. The variation of the electric field E in the guide along a main axis z can be expressed as follows:

$Eij = eij \exp(-i\beta ijZ - i_\omega t)$ where $\beta = 2\pi n/\lambda$.

It can be seen that the product $E_1 E^*_2$ oscillates with a period $\Delta = \beta_1 - \beta_2$ The maximum coupling will occur if the function f(z) has the same period, thus if $\Lambda\Delta = 2\pi$ In this case, only the first term $\chi^{(1)}$ of the Fourier expansion of k(z), which dominates in terms of coupling, is retained, the other terms being oscillatory.

This can be explained in a more intuitive manner. In the equation $k_{ij}(z) = \frac{1}{4}\omega\epsilon_O \int \eta(x,y)^2 f(z) e_i^* e_j dx dy$ fields $e_1$ and $e_2$ are replaced with $E_1$ and $E_2$. It can be seen that the coupling, which is proportional to the value of the integral, is effective only if the conditions Eij=eij exp(-i$\beta$ijZ-i$_\omega$t) and $\Lambda\Delta$=2$\pi$ are satisfied.

For a constant index difference, we can vary k(z), that is to say:

by varying $\eta^2$ directly along the grating (by varying the amplitude h of the grating or the index η for gratings on fibre from one section to another), by varying the overlap of two modes $e_1 e^*_2$ along the grating (by varying the interguide distance from one section to another).

Another method of varying the coupling is to retain a constant coupling coefficient amplitude but to vary the ratio $\rho = \Lambda_+/\Lambda$, as described in H. Sakata, "Side lobe suppression in grating-assisted wavelength-selective couplers", Optics Lett., vol. 17, pp. 463–465, 1992, and consequently to vary the value of the first coefficient in the Fourier expansion. For a meandering grating, $\chi^{(1)}$ is maximum when $\rho$=0.5 and decreases as this ratio changes.

Another method of varying the coupling is to retain a constant coupling coefficient amplitude but to introduce parts with no grating $\Lambda_O$, as described in Q. Guo, W. P. Huang, "Polarisation-independent optical filters based on co-directional phase-shifted grating assisted couplers: theory and decision", IEEE Proc.-Optoelectron., vol. 143, pp. 173–177, 1996; and Y. Shibata, T. Tamamura, S. Oku, Y. Kondo, "Coupling coefficient modulation of waveguide grating using sampled grating", IEEE Photonics Technol. Lett., vol. 6, pp. 1222–1224, 1994. In this case a super-grating period can be introduced: $\Lambda_s = \Lambda + \Lambda_O$ and decomposed as a Fourier series:

$$X^{(m)} = \int_{\Lambda r} k(z) \exp\left(-i\frac{2m\pi}{\Lambda_s}z\right) dz$$

The value of $\chi^{(1)}$ is maximum when $\Lambda_r = \Lambda_s$ and decreases with the introduction of the part with no grating $\Lambda_O$. Apodisation is effected by varying this ratio and consequently $\chi^{(1)}$ along the guides (if the super-grating period comprises n grating periods $\Lambda_p$, it is the coefficient $\chi^{(n)}$ that must be taken as the average value for the coupling coefficient).

All of the above reasoning applies equally to a contradirectional coupler. In this case, the difference is as follows:

$E_1 = e_{1+} \exp(-i\beta_1 Z - i_\omega t)$ $E_2 = e_{2-} \exp(i\beta_2 Z - i_\omega t)$ $\Delta = (\beta_1 + \beta_2)/2$ The symbols – and + designate waves in the two guides propagating to the left and to the right on the main axis z of the guide.

For a Bragg reflector, the difference is that there is only one guide. Consequently, there is no apodisation method by variation of the interguide distance. In this case:

$E_1 = e_+ \exp(-i\beta_1 Z - i_\omega t)$ $E_2 = e_- \exp(i\beta_2 Z - i_\omega t)$ $\Delta = \beta = \beta_1 = \beta_2$ All the reasoning stated is equally valid.

Accordingly, in the preferred embodiments of the invention proposed here, the first Fourier coefficient defined for each section of grating remains constant (the overlapping of the fields $e_1 e^*j$ and the disturbances $\eta^2$ do not change from one section to another), the ratio $\Lambda_+/\Lambda$ is equal to 0.5 for each section and $\chi^{(1)}$ remains the same.

It is possible to make gratings in which the coupling coefficient $k^+$ in the positive part has an absolute value different from the coupling coefficient $k^-$ in the negative part. For the coupling to be efficient the following condition is necessary:

$k^+ \Lambda^+ = k^- \Lambda^-$ where $\Lambda+$ and $\Lambda-$ are the lengths of the segments with a positive and negative coupling coefficient, respectively.
In practice it is preferable for $k^+ \sim k^-$ and consequently for $\Lambda+ \sim \Lambda-$.

The fact that the first Fourier coefficient defined for each section of grating remains constant is obtained by virtue of the fact that the grating is no longer periodic. Each pitch of the grating has its own resonant frequency, in contrast to the other methods described hereinabove in which a common period can be distinguished, the resonant frequency being the same for all sections.

Nevertheless, there is a variant of the invention which combines the method of producing a filter with grating with a distribution of the length of the sections conforming to those proposed previously in the context of the invention with a conventional method of apodisation such as a method in which the average coupling coefficient per section is varied along the grating.

The inventors have found that in some cases a combination of the above kind of a distribution of lengths of sections conforming to the invention and a conventional apodisation method improve the results obtained.

What is claimed is:

1. Device adapted to have an optical wave travel through it and to filter that wave in terms of wavelength, in which an optical parameter of the device varies along the path of the wave in such a manner that the device has a series of sections ($S_{-10}$–$S_{10}$, 500, 600) each constituted by a pair of two successive segments, one in which the values of the optical parameter are less than an average value and the other in which the values of the optical parameter are greater than the average value, characterised in that the device has at least one zone of more than two sections ($S_{-10}$–$S_{10}$, 500, 600) in which the sections ($S_{-10}$–$S_{10}$, 500, 600) have lengths alternately less than the greater than an average length (M) of the sections in that zone ($S_{-10}$–$S_{10}$, 500, 600), in such a manner that in that zone each section having a length less than the average length is immediately followed by a section having a length greater than the average length and each section having a length greater than the average length is immediately followed by a section having a length less than the average length.

2. Device according to claim 1, characterised in that in said zone ($S_{-10}$–$S_{10}$, 500, 600), the segments having values of the optical parameter greater than the average value of the optical parameter have lengths alternately less than and greater than an average length of such segments in that zone, and in that the segments having values of the optical parameter less than the average value (M) of the optical parameter have lengths alternately less than and greater than an average length of such segments in that zone ($S_{-10}$–$S_{10}$, 500, 600).

3. Device according to claim 2, characterised in that, in said zone ($S_{-10}$–$S_{10}$, 500, 600), the two segments forming each section have the same length.

4. Device according to claim 3, characterised in that, in said zone ($S_{-10}$–$S_{10}$, 500, 600), the lengths of the section oscillate about an average length with an amplitude increasing in the direction away from a central part of the device.

5. Device according to claim 1, characterised in that, in said zone ($S_{-10}$–$S_{10}$, 500, 600), the lengths of the segments having values of the optical parameter greater than the average value (M) of the optical parameter oscillate about an average length of those segments with an amplitude that increases in the direction away from a central part of the device.

6. Device according to claim 1, characterised in that the lengths of the segments having values of the optical parameter less than the average value (M) of the optical parameter oscillate about an average length of those segments with an amplitude that increases in the direction away from a central part of the device.

7. Device according to claim 4, characterised in that the amplitude of oscillation of the lengths of the sections is maximum at the ends of the filter.

8. Device according to claim 4, characterised in that the amplitude of oscillation of the lengths of the sections is nil at the centre of the device.

9. Device according to claim 4, characterised in that the amplitude of oscillation of the lengths of the sections increases in a monotonous manner between the centre and at least one end of the filter.

10. Device according to claim 4, characterised in that the amplitude of oscillation of the lengths of the sections increases in a linear manner over said zone in the direction away from the centre.

11. Device according to claim 10, characterised in that the amplitude of oscillation of the lengths of the sections ($S_{-10}$–$S_{10}$, 500, 600) varies in a linear manner between the centre of the device, in which it is nil, and each end of the device, where it is maximum.

12. Device according claim 1, characterised in that the zone including a number N of sections ($S_{-10}$–$S_{10}$, 500, 600) and the sections being numbered s along the zone from one end to the other, the sections having lengths l(s) that vary in accordance with a law of the form $l(s)=l_0 \times (1+_\epsilon(s) \times (-1)^s)$ where $l_0$ is the average length and $_\epsilon(s)=c \times (\sin(\pi.(s-0.5-N/2)/N))$, c being in the range −1 to 1.

13. Device according to claim 12, characterised in that c is substantially equal to 0.7.

14. Device according to claim 1, characterised in that the sections ($S_{-10}$–$S_{10}$, 500, 600) of said zone have a maximum difference relative to the average length of the sections over the zone that is less than 1.0 times that average length.

15. Device according to claim 14, characterised in that the sections ($S_{-10}$–$S_{10}$, 500, 600) of said zone have a maximum difference relative to the average length of the sections over the zone in the range 0.8 times to 1.0 times the average length of the sections of the zone.

16. Device according to claim 1, characterised in that the device conforms to the coupled mode formalism.

17. Device according to claim 1, characterised in that it constitutes a codirectional coupler.

18. Device according to claim 1, characterised in that it constitutes a contradirectional coupler.

19. Device according to claim 1, characterised in that it constitutes a fibre mode converter.

20. Device according to claim 1, characterised in that it constitutes a Bragg mirror.

21. Device according to claim 1, characterised in that it constitutes a Bragg reflector.

22. Device according to claim 16, characterised in that the sections ($S_{-10}$–$S_{10}$, 500, 600) of the zone have average values per section of the coupling coefficient that are the same for all sections of the zone.

* * * * *

UNITED STATES PATENT AND TRADEMARK OFFICE
CERTIFICATE OF CORRECTION

PATENT NO. : 6,549,707 B1
DATED : April 15, 2002
INVENTOR(S) : Lupu et al.

It is certified that error appears in the above-identified patent and that said Letters Patent is hereby corrected as shown below:

Title page,
Item [56], References Cited, FOREIGN PATENT DOCUMENTS, 195 00 136 A1, please delete "FR" and insert -- DE --.
OTHER PUBLICATIONS, "Synthesis of Ideal Window..." reference, please delete "Couples" and insert -- Couplers --.
"Y. Shibata et al.," reference, 'Coupling coefficient...', please delete "sample and insert -- sampled --.

Signed and Sealed this

Seventh Day of September, 2004

JON W. DUDAS
*Director of the United States Patent and Trademark Office*